(12) United States Patent
Kaizuka et al.

(10) Patent No.: US 9,624,559 B2
(45) Date of Patent: Apr. 18, 2017

(54) BEARING STEEL EXCELLENT IN ROLLING-CONTACT FATIGUE PROPERTIES AND METHOD FOR PRODUCING SAME

(71) Applicant: Kobe Steel, Ltd., Kobe-shi (JP)

(72) Inventors: Masaki Kaizuka, Kobe (JP); Yosuke Shindo, Kobe (JP); Manabu Fujita, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 119 days.

(21) Appl. No.: 14/384,065

(22) PCT Filed: Mar. 5, 2013

(86) PCT No.: PCT/JP2013/056009
§ 371 (c)(1),
(2) Date: Sep. 9, 2014

(87) PCT Pub. No.: WO2013/146124
PCT Pub. Date: Oct. 3, 2013

(65) Prior Publication Data
US 2015/0047750 A1    Feb. 19, 2015

(30) Foreign Application Priority Data

Mar. 30, 2012 (JP) ................ 2012-083067

(51) Int. Cl.
| | |
|---|---|
| *C21D 6/00* | (2006.01) |
| *C21D 9/00* | (2006.01) |
| *C21D 9/40* | (2006.01) |
| *C21D 1/32* | (2006.01) |
| *C22C 38/50* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *F16C 33/64* | (2006.01) |
| *F16C 33/62* | (2006.01) |

(52) U.S. Cl.
CPC ............ *C21D 9/00* (2013.01); *C21D 1/32* (2013.01); *C21D 6/00* (2013.01); *C21D 6/004* (2013.01); *C21D 6/005* (2013.01); *C21D 6/008* (2013.01); *C21D 9/40* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/50* (2013.01); *C21D 2201/00* (2013.01); *F16C 33/62* (2013.01); *F16C 33/64* (2013.01)

(58) Field of Classification Search
CPC ....................................................... C22C 38/04
See application file for complete search history.

(56) References Cited

U.S. PATENT DOCUMENTS

| 5,705,124 A | 1/1998 | Ochi et al. |
| 2003/0136474 A1 | 7/2003 | Matsuzaki et al. |
| 2013/0183191 A1 | 7/2013 | Kaizuka et al. |

FOREIGN PATENT DOCUMENTS

| CN | 1129465 A | 8/1996 | |
| JP | 9 165643 | 6/1997 | |
| JP | 2001049388 A * | 2/2001 | ............ C22C 38/00 |
| JP | 2003 328081 | 11/2003 | |
| JP | 2006 63402 | 3/2006 | |
| JP | 3889931 | 3/2007 | |
| JP | 2007 224410 | 9/2007 | |
| JP | 2007 231345 | 9/2007 | |
| JP | 2009 84647 | 4/2009 | |
| JP | 2011 111668 | 6/2011 | |
| JP | 2012 62515 | 3/2012 | |
| TW | 201211279 A1 | 3/2012 | |

OTHER PUBLICATIONS

NPL'1—Pawlowski, Critical points of hypoeutectoid steel—prediction of the pearlite dissolution finish temperature Ac1f, Journal of Achievements in Materials and Manufacturing Engineering, vol. 49, Issue 2, Dec. 2011, pp. 331-336.*
NPL'2—Berns, H; Theisen, W. Ferrous Materials : Steel and Cast Iron. Berlin : Springer, 2008. ISBN: 9783540718475., pp. 59-61.*
English abstract of JP 2001049388 A is included as the first page as part of JP 2001049388 A (Feb. 2001).*
International Search Report and Written Opinion of the International Searching Authority issued May 28, 2013 in PCT/JP13/56009, filed Mar. 5, 2013.

* cited by examiner

*Primary Examiner* — Roy King
*Assistant Examiner* — Jophy S Koshy
(74) *Attorney, Agent, or Firm* — Oblon, McClelland, Maier & Neustadt, L.L.P.

(57) ABSTRACT

A bearing component having increased rolling-contact fatigue life, the bearing component being made of a bearing steel that satisfies a predetermined chemical composition, and Si (boundary Si), Mn (boundary Mn), Cr (boundary Cr), Cu (boundary Cu), Ni (boundary Ni), and Mo (boundary Mo) included in a matrix phase region (boundary surface region) from the surface of spheroidized cementite to 20 nm away satisfy the formula:

$$9.0 \leq 1.4 \times \text{boundary Si} + 1.8 \times \text{boundary Mn} + 5.5 \times \text{boundary Cu} + 4.2 \times \text{boundary Ni} + 4.8 \times \text{boundary Cr} + 5.5 \times \text{boundary Mo}.$$

1 Claim, 1 Drawing Sheet

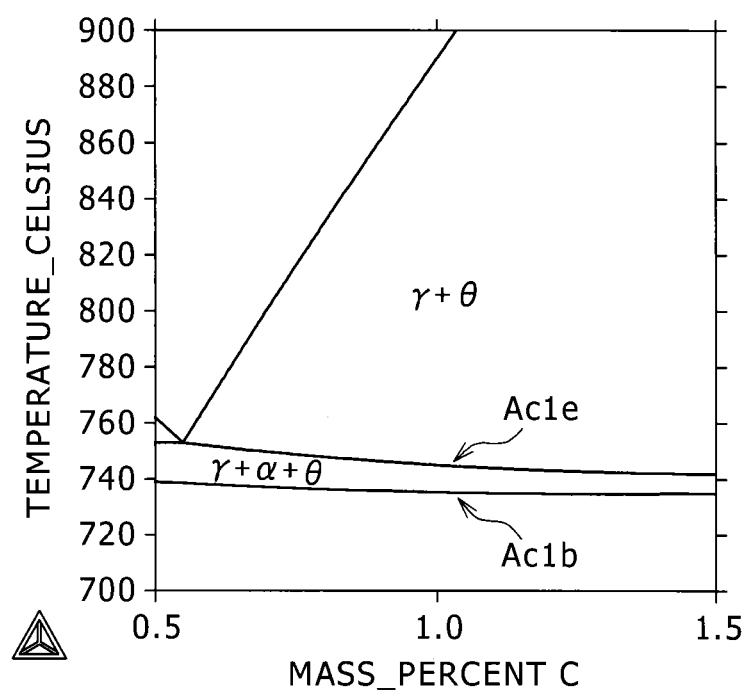

BEARING STEEL EXCELLENT IN ROLLING-CONTACT FATIGUE PROPERTIES AND METHOD FOR PRODUCING SAME

TECHNICAL FIELD

The present invention relates to a bearing steel which is a steel for manufacturing bearing components used for automobiles, various industrial machines and the like and exerts excellent rolling-contact fatigue life when it is used as a bearing component in particular and to a method for producing the same.

BACKGROUND ART

As a bearing steel, high carbon chromium bearing steels such as SUJ2 and the like stipulated in JIS G 4805 (1999) have been used conventionally for the material of bearings used in various fields of automobiles, various industrial machines and the like. However, bearings have a problem that, because they are used in a severe environment as the case of the inner ring, outer ring, rolling element and the like of the ball bearing, roller bearing and the like whose pressure of contacted surface is very high, fatigue fracture is liable to occur from a very fine defect (inclusions and the like), and frequent maintenance (replacement, inspection and the like) is required in order to prevent the fatigue fracture. With respect to this problem, improvement of the bearing steel has been tried in order to increase the rolling-contact fatigue life and to reduce the number of times of the maintenance described above.

Conventionally, extension of the life of the rolling-contact fatigue life has been improved by reducing non-metal inclusions (Patent Literature 1 and Patent Literature 2 for example). However, to reduce the non-metal inclusions industrially is approaching the limit.

Therefore, as a method for improving the life from other aspects, reduction of banded segregation (Patent Literature 3 for example) and suppression of formation of carbide in the center segregation section (Patent Literature 4 for example) have been proposed. Also, in Patent Literature 5, improvement of the rolling-contact fatigue life by miniaturizing the grain size has been disclosed.

In the Patent Literature 3, variation of the hardness caused by banded segregation is reduced by lowering the rolling temperature and increasing the press forging ratio (60 or more), and, in the Patent Literature 4, formation of macro carbide is suppressed by extending the soaking treatment time, and the life is improved. However, because these methods had restriction in rolling method and rolling size, they could not be regarded as methods having high degree of industrial freedom, and the life improvement effect could not necessarily be regarded to be enhanced to a desired level. Further, in the Patent Literature 5, although the grain size is miniaturized by extending the spheroidizing treatment time and applying induction hardening, extension of the spheroidizing treatment deteriorates the productivity and is limited to the induction hardening treatment, and therefore the method cannot be regarded to have high degree of industrial freedom.

Also, in Patent Literature 6, in order to make the polishability in working into a product shape excellent and to stably obtain excellent rolling-contact fatigue life, the size and density of Al-based nitrogen compound dispersed in steel and the size and area ratio of cementite are stipulated in particular. Also, in Patent Literature 7, in order to obtain a wire rod for bearing that does not cause wire breakage even when strong drawing work is effected so that the drawing reduction ratio exceeds approximately 50% (or 70%) and is suitable to strong drawing work, it is proposed to make the average equivalent circle diameter of cementite after spheroidizing annealing and the standard deviation thereof a constant or less and to suppress the variation by controlling the production condition.

However, all of them are for controlling the form of the precipitates, improvement effect of some degree can be seen, but in order to further improve the rolling-contact fatigue life, it seems necessary to study further from other aspects.

CITATION LIST

Patent Literature

[Patent Literature 1] Japanese Patent No. 3889931
[Patent Literature 2] Japanese Unexamined Patent Application Publication No. 2006-63402
[Patent Literature 3] Japanese Unexamined Patent Application Publication No. 2009-84647
[Patent Literature 4] Japanese Unexamined Patent Application Publication No. Hei09 (1997)-165643
[Patent Literature 5] Japanese Unexamined Patent Application Publication No. 2007-231345
[Patent Literature 6] Japanese Unexamined Patent Application Publication No. 2011-111668
[Patent Literature 7] Japanese Unexamined Patent Application Publication No. 2007-224410

SUMMARY OF INVENTION

Technical Problem

The present invention has been developed in view of such circumstances as described above, and its object is to achieve a bearing steel for obtaining a bearing component whose rolling-contact fatigue life is improved further.

Solution to Problem

The bearing steel excellent in rolling-contact fatigue properties of the present invention which could solve the problem described above contains:

C: 0.95-1.10% (means mass %, hereinafter the same with respect to the chemical composition);
Si: 0.15-0.35%;
Mn: 0.2-0.50%;
Cr: 1.30-1.60%;
P: 0.025% or less (exclusive of 0%);
S: 0.025% or less (exclusive of 0%);
Ni: 0.02-0.25%;
Cu: 0.02-0.25%;
Mo: less than 0.08% (inclusive of 0%);
Al: 0.001%-0.050%;
Ti: 0.0015% or less (exclusive of 0%);
O: 0.001% or less (exclusive of 0%); and
N: 0.020% or less (exclusive of 0%), with the remainder consisting of iron and inevitable impurities, in which Si (boundary Si), Mn (boundary Mn), Cr (boundary Cr), Cu (boundary Cu), Ni (boundary Ni), and Mo (boundary Mo) included in a matrix phase region (boundary surface region) from the surface of spheroidized cementite to 20 nm away satisfy the formula (1) below.

$$9.0 \le 1.4 \times \text{boundary Si} + 1.8 \times \text{boundary Mn} + 5.5 \times \text{boundary Cu} + 4.2 \times \text{boundary Ni} + 4.8 \times \text{boundary Cr} + 5.5 \times \text{boundary Mo} \quad (1)$$

(In the formula (1), boundary Si, boundary Mn, boundary Cu, boundary Ni, boundary Cr, and boundary Mo represent the content (mass %) of Si, Mn, Cu, Ni, Cr and Mo, respectively, which are included in the matrix phase region (boundary surface region) from the surface of spheroidized cementite to 20 nm away.)

The present invention includes a method for producing the bearing steel described above, and, in the method, spheroidizing annealing is executed using a steel having the chemical composition described above and the spheroidizing annealing includes:

primary soaking treatment step of holding at a temperature range (T1) of $(Ac_{1e}+30)$–$(Ac_{1e}+50)°$ C. for 2-9 hrs (t1);

secondary soaking treatment step of holding at a temperature range (T2) of $Ac_{1e}$–$(Ac_{1e}+10)°$ C. for 1.5-6 hrs (t2);

tertiary soaking treatment step of holding at a temperature range (T3) of $Ac_{1b}$–$(Ac_{1b}+10)°$ C. for 1-3 hrs (t3); and a step of cooling from the T3 to 680° C. at an average cooling rate of 10-15° C./hr;

in this order.

Advantageous Effects of Invention

According to the present invention, because a bearing steel further improving the rolling-contact fatigue life is achieved, when the bearing obtained by using the bearing steel is used in a severe environment, excellent rolling-contact fatigue life can be exerted, and maintenance (replacement, inspection and the like) can be reduced.

BRIEF DESCRIPTION OF DRAWING

FIG. 1 is a phase diagram used in calculation of $Ac_{1e}$ and $Ac_{1b}$ in the present invention.

DESCRIPTION OF EMBODIMENTS

In the bearing steel, spheroidized cementite is dispersed in martensitic base, and a fragile incompletely-quenched region (bainite, pearlite) is formed in the periphery of this spheroidized cementite. The present inventors considered that a crack was liable to occur and to propagate in this incompletely-quenched region, and, from the viewpoint that suppression of formation of the incompletely-quenched region described above was effective in order to extend the life of the bearing unlike in the case of the prior art of reducing the non-metal inclusions, studied concrete means thereof.

First, the present inventors conducted the line analysis of the periphery of the spheroidized cementite by FE-TEM, and it was known that Cr and Mn which were the quenchability improving elements concentrated in the spheroidized cementite, and the content of Cr and Mn was insufficient in the periphery of the spheroidized cementite (the matrix phase region contacting the spheroidized cementite). As a cause of generation of the incompletely-quenched region described above, the event that quenching becomes insufficient due to shortage of the content of Cr and Mn is probable.

Therefore, the relationship of the content of Cr, Mn and other elements in the matrix region contacting the spheroidized cementite, formation of the incompletely-quenched region and the rolling-contact fatigue life was studied, and it was found out that, when Cr and Mn which were liable to become insufficient and Si, Cu, Ni and Mo which had low equilibrium distribution factor and were liable to concentrate were made to satisfy the formula (1) below in the matrix region from the surface of the spheroidized cementite to the position of 20 nm (this matrix region may be hereinafter referred to as "boundary surface region") in particular, the boundary surface region also was sufficiently quenched at the time of quenching, and extension of the rolling-contact fatigue life could be achieved.

$$9.0 \le 1.4 \times \text{boundary Si} + 1.8 \times \text{boundary Mn} + 5.5 \times \text{boundary Cu} + 4.2 \times \text{boundary Ni} + 4.8 \times \text{boundary Cr} + 5.5 \times \text{boundary Mo} \quad (1)$$

(In the formula (1), boundary Si, boundary Mn, boundary Cu, boundary Ni, boundary Cr, and boundary Mo represent the content (mass %) of Si, Mn, Cu, Ni, Cr and Mo, respectively, which are included in the matrix phase region (boundary surface region) from the surface of spheroidized cementite to 20 nm away.)

The factors of the right side in the formula (1) above (hereinafter referred to as "boundary Di value" were obtained as described below. That is to say, test specimens were taken from a steel bar (60 mm outside diameter) having the chemical composition of the steel Nos. 1-14 in Table 1 in the examples describe below, and the Jominy test was conducted according to the method stipulated in JIS G 0561. At that time, the heating condition of the test specimen was to hold by 920° C.×30 min. Next, the distance from the test specimen end on the cooling medium supply side to the position that exhibits the Rockwell C hardness 60 which was necessary for the bearing strength was obtained for each steel. Also, it was assumed that the effect of each element could be added from this obtained distance of each steel and the content of six elements of Si, Mn, Cr, Cu, Ni and Mo which were said to largely affect the quenchability of steel, and the factor of each element was obtained by the least square method.

Further, as a result of studying the relationship between the boundary Di value and the rolling-contact fatigue life, it was found out that desired rolling-contact fatigue life (1.0× $10^7$ times or more) was obtained when the boundary Di value was made to be 9.0 or more as the formula (1) above. When the boundary Di value is less than 9.0, the quenchability of the boundary surface region becomes insufficient, fragile incompletely-quenched region is formed, therefore generation and propagation of the crack are liable to occur in this region, and the rolling-contact fatigue life extremely decreases.

The boundary Di value is preferably 9.5 or more, and more preferably 10.0 or more.

In the present invention, the range of each of boundary Si, boundary Mn, boundary Cu, boundary Ni, boundary Cr, and boundary Mo is not particularly limited, and the formula (1) above only has to be satisfied.

Also, the present inventors found out that, in order to satisfy the formula (1) so as to reduce the incompletely-quenched region in the boundary surface region, it was necessary to make the content in steel of each quenchability improving element (Si, Mn, Cr, Cu, Ni and Mo) a predetermined range, to conduct a predetermined spheroidizing annealing treatment, to diffuse Cr and Mn in the spheroidized cementite to the matrix phase, and to suppress the region where these Mn and Cr were insufficient.

Below, the chemical composition in containing the quenchability improving elements described above and the production condition will be described in detail.

First, the chemical composition for obtaining the microstructure described above and securing the properties required as a bearing steel will be described.

[C: 0.95-1.10%]

C is an indispensable element for increasing the quenching hardness, maintaining the strength at room temperature and high temperature, and securing the wear resistance. Therefore, C should be contained by 0.95% or more, preferably 0.98% or more. However, when C amount becomes excessively high, huge carbide is liable to be formed, the rolling-contact fatigue properties are affected adversely, and therefore C amount is made to be 1.10% or less, preferably 1.05% or less.

[Si: 0.15-0.35%]

Si is an element useful in solid solution strengthening of the matrix, improving the tempering softening resistance, improving the quenchability of the matrix phase, and improving the quenchability of the boundary surface region (securing boundary Si). In order to exert such effects, Si should be contained by 0.15% or more. Si amount is preferably 0.17% or more, and more preferably 0.20% or more. However, when Si amount becomes excessively high, the workability and machinability extremely deteriorate, and therefore Si amount is made to be 0.35% or less, preferably 0.33% or less, and more preferably 0.30% or less.

[Mn: 0.2-0.50%]

Mn is an element effective in solid solution strengthening of the matrix, improving the quenchability of the matrix phase, and improving the quenchability of the boundary surface region (securing boundary Mn). Further, Mn is also an element required for preventing hot brittleness by S. In order to exert such effects, Mn should be contained by 0.2% or more. Mn amount is preferably 0.25% or more, and more preferably 0.3% or more. However, when Mn amount becomes excessively high, the workability and machinability extremely deteriorate, and therefore Mn amount is made to be 0.50% or less, preferably 0.45% or less, and more preferably 0.40% or less.

[Cr: 1.30-1.60%]

Cr is an element useful in forming fine cementite by being bonded to C, and securing the wear resistance. Further, Cr is also an element useful in improving the quenchability of the matrix phase and improving the quenchability of the boundary surface region (securing boundary Cr). In order to exert such effects, Cr amount is made to be 1.30% or more, preferably 1.35% or more. However, when Cr is contained excessively high, coarse cementite is formed, and the rolling-contact fatigue life decreases adversely. Therefore, Cr amount is made to be 1.60% or less, preferably 1.55% or less, and more preferably 1.50% or less.

[P: 0.025% or less (exclusive of 0%)]

P is an element inevitably contained as impurities, segregates on the grain boundary to cause embrittlement, deteriorates the workability and the rolling-contact fatigue properties, and is therefore preferable to be reduced as much as possible. However, because extreme reduction involves increase of the steel making cost, P amount is made to be 0.025% or less, preferably 0.020% or less (more preferably 0.015% or less).

[S: 0.025% or less (exclusive of 0%)]

S is an element inevitably contained as impurities, segregates as MnS, shortens the rolling-contact fatigue life, and is therefore preferable to be reduced as much as possible. However, because extreme reduction involves increase of the steel making cost, S amount is made to be 0.025% or less, preferably 0.020% or less (more preferably 0.015% or less).

[Ni: 0.02-0.25%]

Ni is an element having low equilibrium distribution factor, acting as an element improving the quenchability of the boundary surface region (securing boundary Ni), increasing the hardness, and contributing to improvement of the rolling-contact fatigue properties. Further, Ni contributes also to improvement of the quenchability of the matrix phase. In order to exert such effects, Ni amount should be 0.02% or more, preferably 0.05% or more, and more preferably 0.07% or more. However, when Ni amount becomes excessively high, the workability deteriorates. Therefore, Ni amount is made to be 0.25% or less, preferably 0.22% or less, and more preferably 0.20% or less.

[Cu: 0.02-0.25%]

Cu is an element having low equilibrium distribution factor, acting as an element improving the quenchability of the boundary surface region (securing boundary Cu), increasing the hardness, and contributing to improvement of the rolling-contact fatigue properties. Further, Cu contributes also to improvement of the quenchability of the matrix phase. In order to exert such effects, Cu amount should be 0.02% or more, preferably 0.05% or more, and more preferably 0.07% or more. However, when Cu amount becomes excessively high, the workability deteriorates. Therefore, Cu amount is made to be 0.25% or less, preferably 0.22% or less, and more preferably 0.20% or less.

[Mo: less than 0.08% (inclusive of 0%)]

Mo is an element having low equilibrium distribution factor, acting as an element improving the quenchability of the boundary surface region (securing boundary Mo), increasing the hardness, and contributing to improvement of the rolling-contact fatigue properties. Mo is not an indispensably added element, the lower limit of the content is not particularly limited as far as the formula (1) above is satisfied, and Mo is an element that can be properly used according to the spheroidizing treatment condition and the amount of the other element (Si, Cr, Mn, Ni, Cu and the like) for improving the quenchability of the boundary surface region. In order to exert the effects described above of Mo, it is preferable to be contained by 0.01% or more, and more preferably 0.03% or more. On the other hand, when Mo amount becomes excessively high, cracking in hot rolling is assisted. Therefore, Mo amount is made to be less than 0.08%, preferably 0.07% or less, and more preferably 0.05% or less.

[Al: 0.001%-0.050%]

Al is a deoxidizing element, is useful in reducing O amount in steel and reducing the oxide that adversely affects the life of the bearing, and therefore is normally added intentionally. In order to exert the deoxidizing effect described above sufficiently, Al amount should be 0.001% or more, preferably more than 0.005%, and more preferably 0.010% or more. However, when Al amount becomes excessively high, alumina-based inclusions are coarsened, and the life of the bearing is shortened. Also, the deoxidizing effect described above saturates. Therefore, Al amount is made to be 0.050% or less, preferably 0.040% or less, and more preferably 0.030% or less.

[Ti: 0.0015% or less (exclusive of 0%)]

T1 is a harmful element which largely affects the rolling-contact fatigue life adversely because T1 is bonded to N in steel and is liable to form coarse TiN. Therefore, T1 is preferable to be reduced as much as possible, however, because extreme reduction involves increase of the steel making cost, the upper limit of T1 amount is made to be 0.0015%, preferably 0.0010% or less.

[O: 0.001% or less (exclusive of 0%)]

O is an element exerting a large effect on the form of inclusions in steel, forms inclusions such as $Al_2O_3$, $SiO_2$ and the like which adversely affect the rolling-contact fatigue properties, and is therefore preferable to be reduced as much as possible. However, because extreme reduction involves increase of the steel making cost, the upper limit of O amount is made to be 0.001%. O amount is preferably 0.0008% or less, and more preferably 0.0006% or less.

[N: 0.020% or less (exclusive of 0%)]

N is one of impurities, the hot workability deteriorates when N amount becomes excessively high, and a defect in producing steel is liable to occur. Also, N is bonded to T1 that is present as inevitable impurities, forms nitride that is harmful to the rolling-contact fatigue properties, and possibly affects the fatigue property of the bearing adversely. Therefore, N amount is made to be 0.020% or less, preferably 0.015% or less, and more preferably 0.010% or less.

The component of the steel of the present invention is as described above, and the remainder consists of iron and inevitable impurities.

[Production Condition]

In order to obtain a bearing steel having the boundary surface region stipulated as described above, it is necessary to use the steel of the chemical composition described above and to conduct spheroidizing annealing in the production process with the condition described below.

In spheroidizing annealing of the prior art, the hot rolled material or hot forged material described above was heated for 2-8 hours at the temperature range of 780-800° C., was thereafter cooled to 680° C. with the cooling rate of 10-15° C./hr and was thereafter cooled in the atmospheric air, and the spheroidized cementite was dispersed. However, as a result, Cr and Mn stayed in the spheroidized cementite that precipitated during cooling and were not diffused to the matrix phase side, Cr and Mn of the boundary surface region became insufficient, and the formula (1) above was not satisfied.

On the other hand, in the present invention, by executing spheroidizing annealing so as to include:

primary soaking treatment step: holding at a temperature range of $(Ac_{1e}+30)$–$(Ac_{1e}+50)°$ C. for 2-9 hrs, secondary soaking treatment step: holding at a temperature range of $Ac_{1e}$–$(Ac_{1e}+10)°$ C. for 1.5-6 hrs, tertiary soaking treatment step: holding at a temperature range of $Ac_{1b}$–$(Ac_{1b}+10)°$ C. for 1-3 hrs, and a step of cooling to 680° C. with an average cooling rate of 10-15° C./hr after the tertiary soaking treatment step, in this order, Cr and Mn in the spheroidized cementite precipitated in each temperature range of the primary-tertiary soaking treatment steps can be sufficiently diffused to the matrix phase side, and Cr and Mn of the boundary surface region (boundary Cr and boundary Mn) can be secured sufficiently. Also, Si, Cu, Ni and Mo of the boundary surface region (boundary Si, boundary Cu, boundary Ni, and boundary Mo) can be secured without diffusing to the matrix phase side, and, as a result, the formula (1) above can be satisfied.

Below, the reason for stipulating the production condition described above will be described in detail.

[Primary soaking treatment: holding at temperature range (T1) of $(Ac_{1e}+30)$–$(Ac_{1e}+50)°$ C. for 2-9 hrs (t1)]

When the soaking temperature T1 in the primary soaking treatment is below $(Ac_{1e}+30)°$ C. or when the soaking time t1 in the primary soaking treatment is less than 2 hrs, Cr and Mn in the spheroidized cementite cannot be diffused sufficiently, boundary Cr and boundary Mn become insufficient, and the formula (1) above is not satisfied. Therefore, T1 is made to be $(Ac_{1e}+30)°$ C. or above, preferably $(Ac_{1e}+35)°$ C. or above. Also, t1 is made to be 2 hrs or more, preferably 4 hrs or more.

On the other hand, when T1 exceeds $(Ac_{1e}+50)°$ C. or when t1 is too long, Si, Ni, Cu and Mo concentrated in the boundary surface region diffuse to the matrix phase side, boundary Si, boundary Ni, boundary Cu and boundary Mo reduce, and the formula (1) above is not satisfied. Therefore, T1 is made to be $(Ac_{1e}+50)°$ C. or below, preferably $(Ac_{1e}+45)°$ C. or below. Also, t1 is made to be 9 hrs or less, preferably 7 hrs or less.

Further, $Ac_{1e}$ (point) described above and $Ac_{1b}$ (point) described below are the transformation points obtained by using THERMO-CALC SOFTWARE Ver. R (ITOCHU Techno-Solutions Corporation), specifying the amount of C, Si, Cr, Mn, Mo and Al of the component of the steel, calculating, thereby working out such phase diagram as FIG. 1, specifying C amount of the component of the steel, and reading from the phase diagram.

[Secondary soaking treatment: holding at temperature range (T2) of $Ac_{1e}$–$(Ac_{1e}+10)°$ C. for 1.5-6 hrs (t2)]

When the soaking temperature T2 in the secondary soaking treatment is below $Ac_{1e}$ or when the soaking time t2 is less than 1.5 hrs, Cr and Mn in the spheroidized cementite precipitated in the two phase zone of austenite (γ)+cementite (θ) as shown in FIG. 1 above cannot be diffused sufficiently to the matrix phase side, boundary Cr and boundary Mn become insufficient, and the formula (1) above is not satisfied. Therefore, T2 is made to be $Ac_{1e}$ or above, preferably $(Ac_{1e}+2)°$ C. or above. Also, t2 is made to be 1.5 hrs or more, preferably 1.7 hrs or more.

On the other hand, when T2 exceeds $(Ac_{1e}+10)°$ C., Cr and Mn in the spheroidized cementite precipitated up to Ac1e point cannot be diffused sufficiently to the matrix phase side, boundary Cr and boundary Mn become insufficient, and the formula (1) above is not satisfied. Therefore, T2 is made to be $(Ac_{1e}+10)°$ C. or below, preferably $(Ac_{1e}+8)°$ C. or below.

Also, when t2 exceeds 6 hrs, Si, Ni, Cu and Mo concentrated in the boundary surface region diffuse to the matrix phase side, boundary Si, boundary Ni, boundary Cu and boundary Mo reduce, and the formula (1) above is not satisfied. Therefore, t2 is made to be 6 hrs or less, preferably 4 hrs or less.

[Tertiary soaking treatment: holding at temperature range (T3) of $Ac_{1b}$–$(Ac_{1b}+10)°$ C. for 1-3 hrs (t3)]

When the soaking temperature T3 in the tertiary soaking treatment is below $Ac_{1b}$ or when the soaking time t3 is less than 1 hr, Cr and Mn in the spheroidized cementite precipitated in the three phase zone of austenite (γ)+ferrite (α)+cementite (θ) as shown in FIG. 1 above cannot be diffused sufficiently to the matrix phase side, boundary Cr and boundary Mn become insufficient, and the formula (1) above is not satisfied. Therefore, T3 is made to be $Ac_{1b}$ or above, preferably $(Ac_{1b}+2)°$ C. or above. Also, t3 is made to be 1 hr or more, preferably 1.5 hrs or more.

On the other hand, when T3 exceeds $(Ac_{1b}+10)°$ C., Cr and Mn in the spheroidized cementite precipitated up to Ac1b point cannot be diffused sufficiently, boundary Cr and boundary Mn become insufficient, and it becomes hard to satisfy the formula (1) above. Therefore, T3 is made to be $(Ac_{1b}+10)°$ C. or below. T3 is preferably $(Ac_{1b}+8)°$ C. or below.

Also, when t3 exceeds 3 hrs, Si, Ni, Cu and Mo concentrated in the boundary surface region diffuse to the matrix phase side, boundary Si, boundary Ni, boundary Cu and boundary Mo reduce, and the formula (1) above cannot be satisfied. Therefore, t3 is made to be 3 hrs or less, preferably 2 hrs or less.

[Average cooling rate from T3 to 680° C.: 10-20° C./hr]

After the tertiary soaking treatment step, when the average cooling rate from T3 described above to 680° C. is less than 10° C./hr, Si, Ni, Cu and Mo concentrated in the boundary surface region diffuse to the matrix phase side, boundary Si, boundary Ni, boundary Cu and boundary Mo reduce, and the formula (1) above is not satisfied. Therefore, the average cooling rate described above is made to be 10° C./hr or more, preferably 12° C./hr or more. On the other hand, when the average cooling rate described above exceeds 20° C./hr, Cr and Mn in the spheroidized cementite cannot be diffused sufficiently, boundary Cr and boundary Mn become insufficient, and the formula (1) above cannot be satisfied. Therefore the average cooling rate described above is made to be 20° C./hr or less, preferably 18° C./hr or less.

Also, as far as soaking is conducted in the range described above, the average cooling rate in cooling from the primary soaking temperature T1 described above to the secondary soaking temperature T2 (CR1) and the average cooling rate in cooling from the secondary soaking temperature T2 to the tertiary soaking temperature T3 (CR2) are not particularly limited. However, from the viewpoint of restriction of facilities and productivity, CR1 and CR2 described above are preferable to be within the range of 60° C./hr-180° C./hr.

Although the cooling rate to the room temperature after cooling to 680° C. described above is not particularly limited, from the viewpoint of improving productivity, natural cooling (cooling in the atmospheric air) is preferable.

Although the steel of the present invention is subjected to spheroidizing annealing as described above, is thereafter worked into a predetermined component shape, is then quenched and tempered, and is manufactured to a bearing component and the like, the shape in the stage of the steel includes either of such wire shape and bar shape that are applicable to such manufacturing, and the size thereof can be properly determined also according to the final product.

EXAMPLES

Although the present invention will be explained below more specifically referring to examples, the present invention is not limited by the examples below, it is a matter of course that the present invention can be also implemented with modifications being appropriately added within the scope adaptable to the purposes described above and below, and any of them is to be included within the technical range of the present invention.

A billet having the chemical composition shown in Table 1 was heated to 1,100-1,300° C. in a heating furnace, and blooming rolling was thereafter executed at 900-1,200° C. Hot rolling was thereafter executed at 830-1,100° C., and a steel (rolled material) with a predetermined diameter (65 mm diameter) was obtained. Also, Mo amount with the underline in Table 1 expresses the Mo amount inevitably mixed in.

Next, using the steel obtained, spheroidizing annealing (heat treatment) was executed. In spheroidizing annealing, the steel was heated with the heat treatment condition (temperature/time) shown in Table 2 or Table 3 from the room temperature to T1 with the average temperature rising rate of 50-150° C./hr, was held at the soaking temperature T1 for the soaking time t1, was thereafter cooled to the soaking temperature T2, was held at the soaking temperature T2 for the soaking time t2, was thereafter cooled to the soaking temperature T3, was held at the soaking temperature T3 for the soaking time t3, was thereafter cooled from the soaking temperature T3 (from T1 in No. 3 that was a comparative example, and from T2 in No. 21 that was also a comparative example) to 680° C. with the average cooling rate shown in Table 2 or Table 3, and was thereafter cooled in the atmospheric air.

Also, cooling from T1 to T2 and cooling from T2 to T3 described above were executed with the average cooling rate shown in Table 2 or Table 3.

TABLE 1

| Steel No. | Chemical composition (mass %) | | | | | | | | | | | | |
|---|---|---|---|---|---|---|---|---|---|---|---|---|---|
| | C | Si | Mn | P | S | Cu | Ni | Cr | Mo | Al | Ti | O | N |
| 1 | 0.99 | 0.34 | 0.29 | 0.012 | 0.001 | 0.21 | 0.24 | 1.49 | <u>0.01</u> | 0.027 | 0.0014 | 0.0006 | 0.0098 |
| 2 | 1.01 | 0.24 | 0.23 | 0.011 | 0.004 | 0.05 | 0.06 | 1.55 | <u>0.01</u> | 0.022 | 0.0009 | 0.0007 | 0.0043 |
| 3 | 0.98 | 0.33 | 0.21 | 0.014 | 0.005 | 0.08 | 0.09 | 1.42 | <u>0.01</u> | 0.026 | 0.0013 | 0.0008 | 0.0041 |
| 4 | 0.97 | 0.16 | 0.31 | 0.013 | 0.004 | 0.08 | 0.09 | 1.51 | 0.04 | 0.023 | 0.0011 | 0.0007 | 0.0047 |
| 5 | 1.02 | 0.22 | 0.28 | 0.014 | 0.003 | 0.07 | 0.06 | 1.58 | <u>0.02</u> | 0.019 | 0.0008 | 0.0008 | 0.0051 |
| 6 | 1.04 | 0.26 | 0.33 | 0.011 | 0.004 | 0.11 | 0.05 | 1.32 | <u>0.02</u> | 0.018 | 0.0013 | 0.0009 | 0.0044 |
| 7 | 0.95 | 0.19 | 0.48 | 0.012 | 0.005 | 0.04 | 0.08 | 1.49 | 0.05 | 0.021 | 0.001 | 0.0008 | 0.0045 |
| 8 | 0.99 | 0.24 | 0.25 | 0.014 | 0.004 | 0.24 | 0.04 | 1.44 | <u>0.01</u> | 0.027 | 0.0012 | 0.0006 | 0.0072 |
| 9 | 1 | 0.25 | 0.24 | 0.014 | 0.005 | 0.03 | 0.07 | 1.5 | <u>0.01</u> | 0.022 | 0.0009 | 0.0007 | 0.0055 |
| 10 | 1.01 | 0.28 | 0.25 | 0.011 | 0.004 | 0.06 | 0.23 | 1.48 | <u>0</u> | 0.021 | 0.0008 | 0.0007 | 0.0038 |
| 11 | 0.96 | 0.21 | 0.26 | 0.011 | 0.004 | 0.12 | 0.02 | 1.44 | <u>0</u> | 0.022 | 0.0014 | 0.0008 | 0.0082 |
| 12 | 1.05 | 0.27 | 0.21 | 0.01 | 0.006 | 0.14 | 0.09 | 1.39 | 0.07 | 0.017 | 0.0009 | 0.0007 | 0.0095 |
| 13 | 1.06 | 0.31 | 0.24 | 0.012 | 0.005 | 0.08 | 0.11 | 1.52 | 0.03 | 0.024 | 0.0011 | 0.0008 | 0.0121 |
| 14 | 1.02 | 0.25 | 0.34 | 0.013 | 0.004 | 0.09 | 0.12 | 1.54 | <u>0</u> | 0.025 | 0.0008 | 0.0009 | 0.0044 |
| 15 | 1.01 | 0.12 | 0.3 | 0.014 | 0.005 | 0.07 | 0.08 | 1.41 | <u>0.01</u> | 0.019 | 0.0008 | 0.0008 | 0.0051 |
| 16 | 1.02 | 0.17 | 0.12 | 0.011 | 0.006 | 0.07 | 0.06 | 1.51 | <u>0.01</u> | 0.018 | 0.0013 | 0.0009 | 0.0044 |
| 17 | 0.98 | 0.22 | 0.25 | 0.013 | 0.004 | 0.02 | 0.02 | 1.13 | <u>0.01</u> | 0.021 | 0.001 | 0.0008 | 0.0045 |
| 18 | 1.01 | 0.28 | 0.25 | 0.023 | 0.004 | 0.08 | 0.09 | 1.5 | <u>0</u> | 0.021 | 0.0008 | 0.0008 | 0.0205 |
| 19 | 0.98 | 0.21 | 0.26 | 0.017 | 0.006 | 0.08 | 0.09 | 1.48 | <u>0</u> | 0.027 | 0.0013 | 0.0014 | 0.0051 |
| 20 | 0.97 | 0.21 | 0.21 | 0.029 | 0.005 | 0.07 | 0.12 | 1.44 | <u>0</u> | 0.022 | 0.001 | 0.0008 | 0.0051 |
| 21 | 1.02 | 0.31 | 0.24 | 0.014 | 0.028 | 0.14 | 0.12 | 1.39 | 0.07 | 0.021 | 0.0012 | 0.0007 | 0.0044 |
| 22 | 1.14 | 0.25 | 0.34 | 0.013 | 0.003 | 0.08 | 0.12 | 1.52 | 0.03 | 0.022 | 0.0009 | 0.0008 | 0.0045 |
| 23 | 0.91 | 0.26 | 0.22 | 0.014 | 0.003 | 0.09 | 0.09 | 1.54 | <u>0</u> | 0.017 | 0.0008 | 0.0009 | 0.0072 |
| 24 | 1.02 | 0.23 | 0.62 | 0.014 | 0.004 | 0.05 | 0.11 | 1.42 | 0.03 | 0.053 | 0.0008 | 0.0008 | 0.0038 |
| 25 | 1.04 | 0.24 | 0.26 | 0.011 | 0.005 | 0.05 | 0.12 | 1.32 | 0.05 | 0.025 | 0.0019 | 0.0007 | 0.0082 |

TABLE 1-continued

| Steel No. | Chemical composition (mass %) | | | | | | | | | | | | |
|---|---|---|---|---|---|---|---|---|---|---|---|---|---|
| | C | Si | Mn | P | S | Cu | Ni | Cr | Mo | Al | Ti | O | N |
| 26 | 0.99 | 0.27 | 0.29 | 0.01 | 0.005 | 0.08 | 0.08 | 1.92 | <u>0.01</u> | 0.023 | 0.0009 | 0.0007 | 0.0047 |
| 27 | 1.01 | 0.26 | 0.25 | 0.012 | 0.005 | 0.01 | 0.03 | 1.42 | <u>0.01</u> | 0.026 | 0.0013 | 0.0008 | 0.0041 |
| 28 | 0.99 | 0.23 | 0.24 | 0.011 | 0.004 | 0.03 | 0.01 | 1.32 | <u>0.01</u> | 0.023 | 0.0011 | 0.0007 | 0.0047 |
| 29 | 1 | 0.19 | 0.25 | 0.014 | 0.005 | 0.04 | 0.04 | 1.12 | <u>0.01</u> | 0.022 | 0.001 | 0.0007 | 0.0049 |

TABLE 2

| No. | Steel No. | Heat treatment condition | Average cooling rate (° C./hr) | Primary soaking treatment | | | | Secondary soaking treatment | |
|---|---|---|---|---|---|---|---|---|---|
| | | | | Ac1e + 30 (° C.) | Ac1e + 50 (° C.) | Temperature T1 (° C.) | Time t1 (hr) | Ac1e (° C.) | Ac1e + 10 (° C.) |
| 1 | 1 | A | 90 | 785 | 805 | 790 | 6 | 755 | 765 |
| 2 | 2 | A | 90 | 784 | 804 | 790 | 6 | 754 | 764 |
| 3 | 2 | B | 90 | 784 | 804 | 790 | 2 | 754 | 764 |
| 4 | 2 | C | 90 | 784 | 804 | 790 | 6 | 754 | 764 |
| 5 | 2 | D | 90 | 784 | 804 | 790 | 2 | 754 | 764 |
| 6 | 2 | E | 90 | 784 | 804 | 770 | 6 | 754 | 764 |
| 7 | 2 | F | 90 | 784 | 804 | 820 | 6 | 754 | 764 |
| 8 | 2 | G | 90 | 784 | 804 | 790 | 1 | 754 | 764 |
| 9 | 2 | H | 90 | 784 | 804 | 790 | 10 | 754 | 764 |
| 10 | 2 | I | 90 | 784 | 804 | 790 | 6 | 754 | 764 |
| 11 | 2 | J | 90 | 784 | 804 | 790 | 6 | 754 | 764 |
| 12 | 2 | K | 90 | 784 | 804 | 790 | 6 | 754 | 764 |
| 13 | 2 | L | 90 | 784 | 804 | 790 | 6 | 754 | 764 |
| 14 | 2 | M | 90 | 784 | 804 | 790 | 6 | 754 | 764 |
| 15 | 2 | N | 90 | 784 | 804 | 790 | 6 | 754 | 764 |
| 16 | 2 | O | 90 | 784 | 804 | 790 | 6 | 754 | 764 |
| 17 | 2 | P | 90 | 784 | 804 | 790 | 6 | 754 | 764 |
| 18 | 2 | Q | 90 | 784 | 804 | 790 | 6 | 754 | 764 |
| 19 | 2 | R | 90 | 784 | 804 | 790 | 6 | 754 | 764 |
| 20 | 2 | S | 90 | 784 | 804 | 790 | 6 | 754 | 764 |
| 21 | 2 | T | 90 | 784 | 804 | 790 | 6 | 754 | 764 |
| 22 | 2 | U | 90 | 784 | 804 | 800 | 8 | 754 | 764 |
| 23 | 2 | V | 100 | 784 | 804 | 790 | 6 | 754 | 764 |
| 24 | 2 | W | 180 | 784 | 804 | 785 | 3 | 754 | 764 |
| 25 | 2 | X | 120 | 784 | 804 | 790 | 6 | 754 | 764 |
| 26 | 3 | A | 90 | 784 | 804 | 790 | 6 | 754 | 764 |
| 27 | 3 | U | 110 | 784 | 804 | 800 | 8 | 754 | 764 |
| 28 | 3 | V | 110 | 784 | 804 | 790 | 6 | 754 | 764 |
| 29 | 3 | W | 180 | 784 | 804 | 785 | 3 | 754 | 764 |

| No. | Secondary soaking treatment | | Tertiary soaking treatment | | | | Average cooling rate to 680° C. (° C./hr) |
|---|---|---|---|---|---|---|---|
| | Temperature T2 (° C.) | Time t2 (hr) | Ac1b (° C.) | Ac1b + 10 (° C.) | Temperature T3 (° C.) | Time t3 (hr) | |
| 1 | 760 | 1.5 | 733 | 743 | 740 | 1.5 | 15 |
| 2 | 760 | 1.5 | 732 | 742 | 740 | 1.5 | 15 |
| 3 | — | — | 732 | 742 | — | — | 15 |
| 4 | 760 | 0.5 | 732 | 742 | 740 | 0.5 | 15 |
| 5 | 760 | 2 | 732 | 742 | 740 | 2 | 20 |
| 6 | 760 | 1.5 | 732 | 742 | 740 | 1.5 | 15 |
| 7 | 760 | 1.5 | 732 | 742 | 740 | 1.5 | 15 |
| 8 | 760 | 1.5 | 732 | 742 | 740 | 1.5 | 15 |
| 9 | 760 | 1.5 | 732 | 742 | 740 | 1.5 | 15 |
| 10 | 748 | 1.5 | 732 | 742 | 740 | 1.5 | 15 |
| 11 | 768 | 1.5 | 732 | 742 | 740 | 1.5 | 15 |
| 12 | 760 | 1 | 732 | 742 | 740 | 1.5 | 15 |
| 13 | 760 | 7 | 732 | 742 | 740 | 1.5 | 15 |
| 14 | 760 | 1.5 | 732 | 742 | 720 | 1.5 | 15 |
| 15 | 760 | 1.5 | 732 | 742 | 745 | 1.5 | 15 |
| 16 | 760 | 1.5 | 732 | 742 | 740 | 0.5 | 15 |
| 17 | 760 | 1.5 | 732 | 742 | 740 | 4 | 15 |
| 18 | 760 | 1.5 | 732 | 742 | 740 | 1.5 | 5 |
| 19 | 760 | 1.5 | 732 | 742 | 740 | 1.5 | 25 |
| 20 | — | — | 732 | 742 | 740 | 1.5 | 15 |
| 21 | 760 | 1.5 | 732 | 742 | — | — | 15 |
| 22 | 760 | 5 | 732 | 742 | 740 | 1.5 | 15 |
| 23 | 760 | 1.5 | 732 | 742 | 735 | 1.2 | 10 |

TABLE 2-continued

| | | | | | | | |
|---|---|---|---|---|---|---|---|
| 24 | 755 | 1.5 | 732 | 742 | 740 | 1.5 | 15 |
| 25 | 760 | 1.5 | 732 | 742 | 742 | 3 | 20 |
| 26 | 760 | 1.5 | 732 | 742 | 740 | 1.5 | 15 |
| 27 | 760 | 5 | 732 | 742 | 740 | 1.5 | 15 |
| 28 | 760 | 1.5 | 732 | 742 | 735 | 1.2 | 10 |
| 29 | 755 | 1.5 | 732 | 742 | 740 | 1.5 | 15 |

TABLE 3

| | | | Average | Primary soaking treatment | | | | Secondary soaking treatment | |
|---|---|---|---|---|---|---|---|---|---|
| No. | Steel No. | Heat treatment condition | cooling rate (° C./hr) | Ac1e + 30 (° C.) | Ac1e + 50 (° C.) | Temperature T1 (° C.) | Time t1 (hr) | Ac1e (° C.) | Ac1e + 10 (° C.) |
| 30 | 4 | A | 90 | 780 | 800 | 790 | 6 | 750 | 760 |
| 31 | 5 | A | 90 | 783 | 803 | 790 | 6 | 753 | 763 |
| 32 | 5 | X | 120 | 783 | 803 | 790 | 6 | 753 | 763 |
| 33 | 5 | Y | 60 | 783 | 803 | 800 | 4 | 753 | 763 |
| 34 | 5 | Z | 100 | 783 | 803 | 790 | 6 | 753 | 763 |
| 35 | 5 | C | 90 | 783 | 803 | 790 | 6 | 753 | 763 |
| 36 | 6 | A | 90 | 780 | 800 | 790 | 6 | 750 | 760 |
| 37 | 7 | A | 90 | 780 | 800 | 790 | 6 | 750 | 760 |
| 38 | 8 | A | 90 | 782 | 802 | 790 | 6 | 752 | 762 |
| 39 | 9 | D | 90 | 783 | 803 | 790 | 2 | 753 | 763 |
| 40 | 10 | D | 90 | 783 | 803 | 790 | 2 | 753 | 763 |
| 41 | 11 | D | 90 | 781 | 801 | 790 | 2 | 751 | 761 |
| 42 | 12 | D | 90 | 782 | 802 | 790 | 2 | 752 | 762 |
| 43 | 13 | D | 90 | 785 | 805 | 790 | 2 | 755 | 765 |
| 44 | 14 | D | 90 | 783 | 803 | 790 | 2 | 753 | 763 |
| 45 | 15 | A | 90 | 780 | 800 | 790 | 6 | 750 | 760 |
| 46 | 16 | A | 90 | 782 | 802 | 790 | 6 | 752 | 762 |
| 47 | 17 | A | 90 | 780 | 800 | 790 | 6 | 750 | 760 |
| 48 | 18 | A | 90 | 784 | 804 | 790 | 6 | 754 | 764 |
| 49 | 19 | A | 90 | 781 | 801 | 790 | 6 | 751 | 761 |
| 50 | 20 | A | 90 | 790 | 810 | 790 | 6 | 760 | 770 |
| 51 | 21 | A | 90 | 783 | 803 | 790 | 6 | 753 | 763 |
| 52 | 22 | A | 90 | 782 | 802 | 790 | 6 | 752 | 762 |
| 53 | 23 | A | 90 | 784 | 804 | 790 | 6 | 754 | 764 |
| 54 | 24 | A | 90 | 780 | 800 | 790 | 6 | 750 | 760 |
| 55 | 25 | A | 90 | 780 | 800 | 790 | 6 | 750 | 760 |
| 56 | 26 | A | 90 | 790 | 810 | 790 | 6 | 760 | 770 |
| 57 | 27 | A | 90 | 782 | 802 | 790 | 6 | 752 | 762 |
| 58 | 28 | A | 90 | 783 | 803 | 790 | 6 | 753 | 763 |
| 59 | 29 | A | 90 | 780 | 800 | 790 | 6 | 750 | 760 |

| | Secondary soaking treatment | | Tertiary soaking treatment | | | | Average |
|---|---|---|---|---|---|---|---|
| No. | Temperature T2 (° C.) | Time t2 (hr) | Ac1b (° C.) | Ac1b + 10 (° C.) | Temperature T3 (° C.) | Time t3 (hr) | cooling rate to 680° C. (° C./hr) |
| 30 | 760 | 1.5 | 730 | 740 | 740 | 1.5 | 15 |
| 31 | 760 | 1.5 | 731 | 741 | 740 | 1.5 | 15 |
| 32 | 763 | 3 | 731 | 741 | 740 | 1.5 | 15 |
| 33 | 760 | 1.5 | 731 | 741 | 740 | 1.5 | 15 |
| 34 | 753 | 1.5 | 731 | 741 | 731 | 1.5 | 15 |
| 35 | 760 | 0.5 | 731 | 741 | 740 | 0.5 | 15 |
| 36 | 760 | 1.5 | 730 | 740 | 740 | 1.5 | 15 |
| 37 | 760 | 1.5 | 730 | 740 | 740 | 1.5 | 15 |
| 38 | 760 | 1.5 | 730 | 740 | 740 | 1.5 | 15 |
| 39 | 760 | 2 | 731 | 741 | 740 | 2 | 20 |
| 40 | 760 | 2 | 731 | 741 | 740 | 2 | 20 |
| 41 | 760 | 2 | 731 | 741 | 740 | 2 | 20 |
| 42 | 760 | 2 | 730 | 740 | 740 | 2 | 20 |
| 43 | 760 | 2 | 733 | 743 | 740 | 2 | 20 |
| 44 | 760 | 2 | 731 | 741 | 740 | 2 | 20 |
| 45 | 760 | 1.5 | 730 | 740 | 740 | 1.5 | 15 |
| 46 | 760 | 1.5 | 730 | 740 | 740 | 1.5 | 15 |
| 47 | 760 | 1.5 | 730 | 740 | 740 | 1.5 | 15 |
| 48 | 760 | 1.5 | 732 | 742 | 740 | 1.5 | 15 |
| 49 | 760 | 1.5 | 730 | 740 | 740 | 1.5 | 15 |
| 50 | 760 | 1.5 | 740 | 750 | 740 | 1.5 | 15 |
| 51 | 760 | 1.5 | 731 | 741 | 740 | 1.5 | 15 |
| 52 | 760 | 1.5 | 730 | 740 | 740 | 1.5 | 15 |
| 53 | 760 | 1.5 | 732 | 742 | 740 | 1.5 | 15 |

TABLE 3-continued

| | | | | | | | |
|---|---|---|---|---|---|---|---|
| 54 | 760 | 1.5 | 730 | 740 | 740 | 1.5 | 15 |
| 55 | 760 | 1.5 | 731 | 741 | 740 | 1.5 | 15 |
| 56 | 760 | 1.5 | 738 | 748 | 740 | 1.5 | 15 |
| 57 | 760 | 1.5 | 730 | 740 | 740 | 1.5 | 15 |
| 58 | 760 | 1.5 | 730 | 740 | 740 | 1.5 | 15 |
| 59 | 760 | 1.5 | 730 | 740 | 740 | 1.5 | 15 |

Using the steel having been subjected to spheroidizing annealing described above, measurement of the content of each element (Fe, Si, Mn, Cr, Cu, Ni, Mo) of the boundary surface region, calculation of the boundary Di value, and measurement of the rolling-contact fatigue life were executed as described below.

[Measurement of Content of Each Element in Boundary Surface Region]

The test specimen after having been subjected to spheroidizing annealing described above was cut at the vertical cross section (the cross section parallel to the rolling direction) so that the position of D (diameter)/4 could be observed, the cross section was polished, the sample was prepared by the thin film method, and observation of the spheroidized cementite by FE-TEM (field emission type transmission electron microscope) was executed. At this time, line analysis of the spheroidized cementite was executed so as to pass generally the center of the circle of the spheroidized cementite by EDX (energy dispersion type X-ray detector) of TEM (the measuring condition was as described below), and the content of each element of Fe, Si, Mn, Cr, Cu, Ni and Mo was measured. This analysis was executed for 5 pieces of spheroidized cementite selected optionally, the average value of each element described above of the matrix phase region (boundary surface region) from the surface of the spheroidized cementite to the position of 20 nm to the matrix phase side was obtained, and was made to be the amount of boundary Fe, boundary Si, boundary Mn, boundary Cr, boundary Cu, boundary Ni and boundary Mo, respectively. Also, using these measured values, the value of the right side of the formula (1) (boundary Di value) was obtained.

(Measuring Condition)
Magnification: 500,000 times
Measurement step: 2 nm
Analysis length: 100 nm

[Measurement of Rolling-Contact Fatigue Life]

After spheroidizing annealing described above, the test specimen with 60 mm diameter and 6 mm thickness was cut out, oil quenching was executed after heating for 30 min at 840° C., and tempering was executed for 120 min at 160° C. Next, finish polishing was executed, and the thrust rolling-contact fatigue test specimen with the surface toughness: 0.04 μm Ra or less was prepared.

Also, with a thrust type rolling-contact fatigue tester, the rolling-contact fatigue test was executed for each steel (test specimen) by 16 times each in the condition of repetition speed: 1,500 rpm, pressure of contacted surface: 5.3 GPa, and number of times of suspension: $2 \times 10^8$ times, and fatigue life L10 (the stress repetition number until fatigue failure at 10% of the cumulative failure probability obtained by plotting on the Weibull probability paper) was evaluated. At this time, $1.0 \times 10^7$ times or more in terms of the fatigue life L10 (L10 life) was made to be the acceptance criterion.

These results are shown in Table 4 and Table 5.

TABLE 4

| | | Heat | Content of each element of boundary surface region (mass %) | | | | | | | | | |
|---|---|---|---|---|---|---|---|---|---|---|---|---|
| No. | Steel No. | treatment condition | Boundary Si | Boundary Cr | Boundary Mn | Boundary Fe | Boundary Cu | Boundary Ni | Boundary Mo | Total | Boundary Di value | Life (hr)* |
| 1 | 1 | A | 0.73 | 1.36 | 0.26 | 97.18 | 0.13 | 0.33 | 0.01 | 100 | 10.4 | 8.6E+07 |
| 2 | 2 | A | 0.67 | 1.42 | 0.3 | 97.41 | 0.07 | 0.12 | 0.01 | 100 | 9.3 | 5.2E+07 |
| 3 | 2 | B | 0.71 | 0.9 | 0.12 | 98.03 | 0.09 | 0.14 | 0.01 | 100 | 6.7 | 4.2E+06 |
| 4 | 2 | C | 0.73 | 0.96 | 0.15 | 97.91 | 0.09 | 0.15 | 0.01 | 100 | 7.2 | 5.6E+06 |
| 5 | 2 | D | 0.67 | 1.58 | 0.35 | 97.2 | 0.07 | 0.12 | 0.01 | 100 | 10.2 | 6.4E+07 |
| 6 | 2 | E | 0.7 | 1.14 | 0.24 | 97.7 | 0.08 | 0.13 | 0.01 | 100 | 8 | 4.7E+06 |
| 7 | 2 | F | 0.48 | 1.48 | 0.34 | 97.61 | 0.03 | 0.05 | 0.01 | 100 | 8.8 | 8.2E+06 |
| 8 | 2 | G | 0.68 | 1.21 | 0.22 | 97.67 | 0.08 | 0.13 | 0.01 | 100 | 8.3 | 5.1E+06 |
| 9 | 2 | H | 0.45 | 1.5 | 0.35 | 97.62 | 0.03 | 0.04 | 0.01 | 100 | 8.9 | 6.4E+06 |
| 10 | 2 | I | 0.69 | 1.22 | 0.22 | 97.64 | 0.08 | 0.14 | 0.01 | 100 | 8.4 | 6.1E+06 |
| 11 | 2 | J | 0.66 | 1.21 | 0.24 | 97.73 | 0.05 | 0.1 | 0.01 | 100 | 8 | 3.5E+06 |
| 12 | 2 | K | 0.69 | 1.25 | 0.25 | 97.59 | 0.08 | 0.13 | 0.01 | 100 | 8.5 | 6.8E+06 |
| 13 | 2 | L | 0.49 | 1.49 | 0.33 | 97.59 | 0.04 | 0.05 | 0.01 | 100 | 8.9 | 5.2E+06 |
| 14 | 2 | M | 0.68 | 1.26 | 0.25 | 97.61 | 0.07 | 0.12 | 0.01 | 100 | 8.5 | 4.3E+06 |
| 15 | 2 | N | 0.69 | 1.27 | 0.28 | 97.54 | 0.08 | 0.13 | 0.01 | 100 | 8.7 | 8.1E+06 |
| 16 | 2 | O | 0.7 | 1.24 | 0.26 | 97.57 | 0.08 | 0.14 | 0.01 | 100 | 8.6 | 5.4E+06 |
| 17 | 2 | P | 0.44 | 1.5 | 0.35 | 97.62 | 0.03 | 0.05 | 0.01 | 100 | 8.9 | 7.8E+06 |
| 18 | 2 | Q | 0.44 | 1.48 | 0.36 | 97.62 | 0.03 | 0.06 | 0.01 | 100 | 8.9 | 6.9E+06 |
| 19 | 2 | R | 0.69 | 1.22 | 0.23 | 97.63 | 0.08 | 0.14 | 0.01 | 100 | 8.4 | 5.2E+06 |
| 20 | 2 | S | 0.7 | 1.02 | 0.2 | 97.85 | 0.08 | 0.14 | 0.01 | 100 | 7.4 | 3.3E+06 |
| 21 | 2 | T | 0.69 | 1.11 | 0.22 | 97.76 | 0.08 | 0.13 | 0.01 | 100 | 7.8 | 4.5E+06 |
| 22 | 2 | U | 0.55 | 1.59 | 0.37 | 97.32 | 0.05 | 0.11 | 0.01 | 100 | 9.9 | 6.1E+07 |
| 23 | 2 | V | 0.69 | 1.36 | 0.26 | 97.46 | 0.08 | 0.14 | 0.01 | 100 | 9.1 | 1.8E+07 |
| 24 | 2 | W | 0.72 | 1.34 | 0.25 | 97.45 | 0.09 | 0.14 | 0.01 | 100 | 9.1 | 2.0E+07 |
| 25 | 2 | X | 0.66 | 1.38 | 0.32 | 97.43 | 0.07 | 0.13 | 0.01 | 100 | 9.2 | 2.1E+07 |
| 26 | 3 | A | 0.93 | 1.3 | 0.27 | 97.19 | 0.1 | 0.2 | 0.01 | 100 | 9.6 | 5.2E+07 |
| 27 | 3 | U | 0.78 | 1.59 | 0.35 | 97.04 | 0.08 | 0.15 | 0.01 | 100 | 10.6 | 3.8E+07 |

TABLE 4-continued

| | | Heat | Content of each element of boundary surface region (mass %) | | | | | | | | | |
|---|---|---|---|---|---|---|---|---|---|---|---|---|
| No. | Steel No. | treatment condition | Boundary Si | Boundary Cr | Boundary Mn | Boundary Fe | Boundary Cu | Boundary Ni | Boundary Mo | Total | Boundary Di value | Life (hr)* |
| 28 | 3 | V | 0.95 | 1.25 | 0.24 | 97.2 | 0.13 | 0.22 | 0.01 | 100 | 9.6 | 3.9E+07 |
| 29 | 3 | W | 0.97 | 1.23 | 0.25 | 97.16 | 0.13 | 0.25 | 0.01 | 100 | 9.7 | 4.3E+07 |

*aE + b expresses a ×10$^b$.

TABLE 5

| | | Heat | Content of each element of boundary surface region (mass %) | | | | | | | | | |
|---|---|---|---|---|---|---|---|---|---|---|---|---|
| No. | Steel No. | treatment condition | Boundary Si | Boundary Cr | Boundary Mn | Boundary Fe | Boundary Cu | Boundary Ni | Boundary Mo | Total | Boundary Di value | Life (hr)* |
| 30 | 4 | A | 0.45 | 1.38 | 0.33 | 97.48 | 0.1 | 0.2 | 0.06 | 100 | 9.7 | 5.2E+07 |
| 31 | 5 | A | 0.62 | 1.44 | 0.24 | 97.44 | 0.07 | 0.17 | 0.02 | 100 | 9.6 | 4.6E+07 |
| 32 | 5 | X | 0.6 | 1.53 | 0.28 | 97.36 | 0.06 | 0.15 | 0.02 | 100 | 9.9 | 4.1E+07 |
| 33 | 5 | Y | 0.59 | 1.58 | 0.27 | 97.32 | 0.06 | 0.16 | 0.02 | 100 | 10.1 | 5.2E+07 |
| 34 | 5 | Z | 0.67 | 1.29 | 0.27 | 97.47 | 0.09 | 0.19 | 0.02 | 100 | 9.1 | 2.3E+07 |
| 35 | 5 | C | 0.67 | 0.97 | 0.18 | 97.89 | 0.08 | 0.18 | 0.03 | 100 | 7.4 | 8.2E+06 |
| 36 | 6 | A | 0.73 | 1.21 | 0.43 | 97.27 | 0.06 | 0.27 | 0.03 | 100 | 9.5 | 5.1E+07 |
| 37 | 7 | A | 0.53 | 1.37 | 0.62 | 97.24 | 0.09 | 0.10 | 0.05 | 100 | 9.6 | 5.8E+07 |
| 38 | 8 | A | 0.67 | 1.32 | 0.33 | 97.03 | 0.05 | 0.59 | 0.01 | 100 | 11.4 | 5.2E+07 |
| 39 | 9 | D | 0.70 | 1.53 | 0.37 | 97.24 | 0.08 | 0.07 | 0.01 | 100 | 9.8 | 5.7E+07 |
| 40 | 10 | D | 0.79 | 1.51 | 0.38 | 96.90 | 0.27 | 0.15 | 0 | 100 | 11 | 9.6E+07 |
| 41 | 11 | D | 0.59 | 1.47 | 0.40 | 97.22 | 0.02 | 0.30 | 0 | 100 | 10.3 | 6.4E+07 |
| 42 | 12 | D | 0.76 | 1.42 | 0.29 | 96.96 | 0.11 | 0.35 | 0.11 | 100 | 11.3 | 1.7E+08 |
| 43 | 13 | D | 0.84 | 1.55 | 0.37 | 96.86 | 0.13 | 0.20 | 0.05 | 100 | 11.2 | 1.5E+08 |
| 44 | 14 | D | 0.70 | 1.57 | 0.52 | 96.85 | 0.14 | 0.22 | 0 | 100 | 11.3 | 1.4E+08 |
| 45 | 15 | A | 0.23 | 1.21 | 0.28 | 98.04 | 0.08 | 0.15 | 0.01 | 100 | 7.9 | 6.4E+06 |
| 46 | 16 | A | 0.33 | 1.46 | 0.1 | 97.91 | 0.06 | 0.13 | 0.01 | 100 | 8.7 | 8.9E+06 |
| 47 | 17 | A | 0.61 | 0.92 | 0.28 | 98.1 | 0.03 | 0.05 | 0.01 | 100 | 6.2 | 3.4E+06 |
| 48 | 18 | A | 0.79 | 1.37 | 0.33 | 97.20 | 0.11 | 0.20 | 0 | 100 | 9.8 | 4.5E+06 |
| 49 | 19 | A | 0.59 | 1.36 | 0.34 | 97.40 | 0.11 | 0.20 | 0 | 100 | 9.5 | 3.8E+06 |
| 50 | 20 | A | 0.61 | 1.32 | 0.25 | 97.51 | 0.14 | 0.17 | 0 | 100 | 10.7 | 6.7E+06 |
| 51 | 21 | A | 0.87 | 1.27 | 0.31 | 96.97 | 0.14 | 0.35 | 0.09 | 100 | 10.9 | 5.8E+06 |
| 52 | 22 | A | 0.70 | 1.39 | 0.44 | 97.08 | 0.14 | 0.20 | 0.05 | 100 | 10.4 | 5.3E+06 |
| 53 | 23 | A | 0.73 | 1.41 | 0.29 | 97.24 | 0.11 | 0.22 | 0 | 100 | 10 | 3.1E+06 |
| 54 | 24 | A | 0.65 | 1.30 | 0.81 | 96.95 | 0.13 | 0.12 | 0.04 | 100 | 10 | 7.1E+06 |
| 55 | 25 | A | 0.67 | 1.21 | 0.34 | 97.44 | 0.14 | 0.12 | 0.08 | 100 | 9.1 | 4.2E+06 |
| 56 | 26 | A | 0.76 | 1.76 | 0.38 | 96.80 | 0.09 | 0.20 | 0.01 | 100 | 11.7 | 6.2E+06 |
| 57 | 27 | A | 0.61 | 1.22 | 0.31 | 97.81 | 0.04 | 0 | 0.01 | 100 | 7.5 | 7.6E+06 |
| 58 | 28 | A | 0.45 | 1.13 | 0.22 | 98.15 | 0 | 0.04 | 0.01 | 100 | 6.7 | 5.2E+06 |
| 59 | 29 | A | 0.54 | 0.88 | 0.28 | 98.15 | 0.05 | 0.09 | 0.01 | 100 | 6.2 | 4.7E+06 |

*aE + b expresses a ×10$^b$.

From Tables 1-5, following consideration can be made. That is to say, in Nos. 1, 2, 5, 22-34, 36-44, the requirements stipulated in the present invention are satisfied, and the bearing steel excellent in rolling-contact fatigue properties is obtained. On the other hand, examples other than the above Nos. do not satisfy any of the requirements stipulated in the present invention, and are therefore inferior in rolling-contact fatigue properties. The details thereof are as described below.

That is to say, in No. 3, because the secondary soaking treatment and the tertiary soaking treatment were not executed, boundary Cr and boundary Mn became insufficient, the formula (1) was not satisfied, and the rolling-contact fatigue life became short.

In No. 4, because the soaking time (t2 and t3) of the secondary soaking treatment step and the tertiary soaking treatment step were short, boundary Cr and boundary Mn became insufficient, the formula (1) was not satisfied, and the rolling-contact fatigue life became short.

In No. 6, because the soaking temperature T1 of the primary soaking treatment step was too low, and, in No. 8, because the soaking time t1 of the primary soaking treatment step was too short, in both cases, boundary Cr and boundary Mn became insufficient, the formula (1) was not satisfied, and the rolling-contact fatigue life became short.

In No. 7, because the soaking temperature T1 of the primary soaking treatment step was too high, and, in No. 9, because the soaking time t1 of the primary soaking treatment step was too long, in both cases, Si, Ni and Cu concentrated in the boundary surface region diffused to the matrix phase side, boundary Si, boundary Ni and boundary Cu reduced (also, with respect to boundary Mo, because Mo amount in the steel was less, boundary Mo was also less and the reduction amount by diffusion was also less; the same with respect to Nos. 13, 17, 18 below), the formula (1) was not satisfied, and the rolling-contact fatigue life became short.

In No. 10, because the soaking temperature T2 of the secondary soaking treatment step was too low, and, in No. 12, because the soaking time t2 of the secondary soaking treatment step was too short, in both cases, boundary Cr and boundary Mn became insufficient, the formula (1) was not satisfied, and the rolling-contact fatigue life became short.

In No. 11, because the soaking temperature T2 of the secondary soaking treatment step was too high, Cr and Mn in the spheroidized cementite precipitated up to $Ac_{1e}$ point could not be diffused sufficiently, boundary Cr and boundary Mn became insufficient, the formula (1) was not satisfied, and the rolling-contact fatigue life became short.

In No. 13, because the soaking time t2 of the secondary soaking treatment step was too long, Si, Ni and Cu concentrated in the boundary surface region diffused to the matrix phase side, boundary Si, boundary Ni and boundary Cu reduced, the formula (1) was not satisfied as a result, and the rolling-contact fatigue life became short.

In No. 14, because the soaking temperature T3 of the tertiary soaking treatment step was too low, and, in No. 16, because the soaking time t3 of the tertiary soaking treatment step was too short, in both cases, boundary Cr and boundary Mn became insufficient, the formula (1) was not satisfied, and the rolling-contact fatigue life became short.

In No. 15, because the soaking temperature T3 of the tertiary soaking treatment step was too high, Cr and Mn in the spheroidized cementite precipitated up to $Ac_{1b}$ point could not be diffused sufficiently, boundary Cr and boundary Mn became insufficient, the formula (1) was not satisfied, and the rolling-contact fatigue life became short.

In No. 17, because the soaking time t3 of the tertiary soaking treatment step was too long, Si, Ni and Cu concentrated in the boundary surface region diffused to the matrix phase side, boundary Si, boundary Ni and boundary Cu became insufficient, the formula (1) was not satisfied as a result, and the rolling-contact fatigue life became short.

In No. 18, because the average cooling rate up to 680° C. was too slow, Si, Ni and Cu concentrated in the boundary surface region diffused to the matrix phase side, boundary Si, boundary Ni and boundary Cu reduced, the formula (1) was not satisfied as a result, and the rolling-contact fatigue life became short. On the other hand, in No. 19, because the average cooling rate up to 680° C. was too fast, Cr and Mn in the spheroidized cementite could not be diffused sufficiently, boundary Cr and boundary Mn became insufficient, the formula (1) was not satisfied, and the rolling-contact fatigue life became short.

In No. 20, because the secondary soaking treatment was not executed, and, in No. 21, because the tertiary soaking treatment was not executed, Cr and Mn in the spheroidized cementite precipitated in each temperature range could not be diffused sufficiently, boundary Cr and boundary Mn became insufficient, the formula (1) was not satisfied, and the rolling-contact fatigue life became short.

In No. 45, because Si amount in the steel was insufficient, boundary Si also reduced, the formula (1) was not satisfied, quenching of the boundary surface region was insufficient, and, due to insufficient quenching of the matrix phase and deterioration of the softening resistance, the rolling-contact fatigue life became short.

In No. 46, Mn amount in the steel was insufficient, therefore boundary Mn also reduced, the formula (1) was not satisfied, quenching of the boundary surface region was insufficient, quenching of the matrix phase was also insufficient, and the rolling-contact fatigue life became short.

In No. 47, Cr in the steel was insufficient, therefore boundary Cr was less, the formula (1) was not satisfied, quenching of the boundary surface region was insufficient, quenching of the matrix phase was also insufficient, and the rolling-contact fatigue life became short.

In No. 48, because N amount in the steel was excessively high, coarse nitride (TiN and the like) was formed, and the rolling-contact fatigue life became short. In No. 49, because O amount in the steel was excessively high, coarse oxide was dispersed in the steel, and the rolling-contact fatigue life became short.

In No. 50, because P amount in the steel was excessively high, the grain boundary was embrittled, and the rolling-contact fatigue life became short. In No. 51, because S amount in the steel was excessively high, coarse MnS was formed, and the rolling-contact fatigue life became short.

In No. 52, because C amount in the steel was excessively high, coarse carbide was formed, and the rolling-contact fatigue life became short. Also, in No. 53, because C amount in the steel was insufficient, the strength could not be secured, and the rolling-contact fatigue life became short.

In No. 54, because Al amount in the steel was excessively high, coarse $Al_2O_3$ was formed, and the rolling-contact fatigue life became short. Also, because Mn amount in the steel is excessively high, the workability and machinability cannot be secured.

In No. 55, because T1 amount in the steel was excessively high, coarse TiN was formed, and the rolling-contact fatigue life became short. Also, in No. 56, because Cr amount in the steel was excessively high and coarse carbide was formed, the rolling-contact fatigue life became short.

In No. 57, because Cu amount in the steel was insufficient, boundary Cu could not be secured, in No. 58, because Ni amount in the steel was insufficient, boundary Ni could not be secured, in No. 59, because Cr amount in the steel was insufficient, boundary Cr could not be secured sufficiently, any of them did not satisfy the formula (1), and therefore quenching of the boundary surface region was insufficient. Further, in all of them, quenching of the matrix phase was also insufficient, and the rolling-contact fatigue life became short.

The invention claimed is:

1. A bearing steel, comprising
iron and, by mass percent:
C: 0.95-1.10%;
Si: 0.15-0.35%;
Mn: 0.2-0.50%;
Cr: 1.30-1.60%;
P: from greater than 0 to 0.025%;
S: from greater than 0 to 0.025%;
Ni: 0.02-0.25%;
Cu: 0.02-0.25%;
Mo: from 0% to less than 0.08%;
Al: 0.001%-0.050%;
Ti: from greater than 0 to 0.0015%;
O: from greater than 0 to 0.001%; and
N: from greater than 0 to 0.020%,
wherein boundary Si, boundary Mn, boundary Cr, boundary Cu, boundary Ni, and boundary Mo included in a matrix phase boundary surface region from a surface of spheroidized cementite to 20 nm away satisfies formula (1):

$$9.0 \le 1.4 \times \text{boundary Si} + 1.8 \times \text{boundary Mn} + 5.5 \times \text{boundary Cu} + 4.2 \times \text{boundary Ni} + 4.8 \times \text{boundary Cr} + 5.5 \times \text{boundary Mo} \qquad (1),$$

where boundary Si, boundary Mn, boundary Cu, boundary Ni, boundary Cr, and boundary Mo represent the mass % content of Si, Mn, Cu, Ni, Cr and Mo, respectively, which are included in the matrix phase boundary surface region from the surface of spheroidized cementite to 20 nm away.

* * * * *